Dec. 16, 1924.

H. B. ROSS 1,519,420

TRANSMISSION GEAR SET

Filed March 24, 1924     6 Sheets-Sheet 1

Fig. 1.

Inventor

Harry B. Ross.

By   A. J. O'Brien

Attorney

Dec. 16, 1924.                                                  1,519,420
              H. B. ROSS
           TRANSMISSION GEAR SET
        Filed March 24, 1924      6 Sheets-Sheet 3

Inventor
Harry B. Ross.
By A. J. O'Brien
    Attorney

Inventor
Harry B. Ross.
By A. J. O'Brien
Attorney

Dec. 16, 1924.

H. B. ROSS

TRANSMISSION GEAR SET

Filed March 24, 1924      6 Sheets-Sheet 5

Inventor
Harry B. Ross
By A. J. O'Brien
Attorney

Fig. 12.

Patented Dec. 16, 1924. 1,519,420

UNITED STATES PATENT OFFICE.

HARRY B. ROSS, OF DENVER, COLORADO.

TRANSMISSION-GEAR SET.

Application filed March 24, 1924. Serial No. 701,314.

*To all whom it may concern:*

Be it known that I, Harry B. Ross, a citizen of the United States, residing at Denver, in the county of Denver and State of Colorado, have invented certain new and useful Improvements in Transmission-Gear Sets; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to improvements in the construction of transmission gear sets of the type used in combination with gasoline driven automobiles.

Owing to various obvious and well understood reasons, automobiles driven by internal combustion motors are always provided with gear sets, by means of which the gear ratio between the engine and the propeller shaft can be altered from a direct drive to an intermediate or low speed ratio, and which also permits the automobile to be reversed.

The ordinary transmission gear is so constructed that the gears slide into and out of mesh or are otherwise connected and disconnected by positive means. This method of connecting the parts is often accompanied by severe shocks and strains due to the fact that gears that are standing still or which are revolving at a speed greatly different from that of the driving gears, are forced very suddenly to change their angular velocity. The inertia of the parts is often sufficient to cause gears to be stripped or shafts to be twisted and even when no material damage is done, the clashing of gear teeth causes a disagreeable noise that is highly objectionable. It is evident that if the gear sets were so constructed that the cooperating gears would be brought to substantially the same pitch velocity before the gears would be brought into mesh, then they would be connected without strain or shock. Or if the gears were always in mesh and the driving gears were connected to or disconnected from the driving shaft by some means such as a clutch that would not act suddenly but gradually, they would be connected with the driving shaft without shock or noise.

One of the objects of my present invention is to produce a gear set in which the gears, with the exception of the reverse gear, are always in mesh and in which the drive gears are positively connected to the drive shaft by means that do not effect an immediate positive connection, but which first subjects the driven parts to a gradually increasing torque that starts them moving and brings the parts to be connected to the same relative speed before positive connection takes place, whereby excessive strains due to causes hereinbefore mentioned will be avoided.

Another object of this invention is to produce a gear set so constructed that there is no possibility of the gears slipping out of mesh as they sometimes do with transmissions of ordinary construction.

The above and other objects, that will become apparent as the description proceeds, are attained by means of a construction which will now be described in detail, reference for this purpose being had to the accompanying drawings in which the preferred embodiment of my invention is illustrated, and in which:

Figure 2:
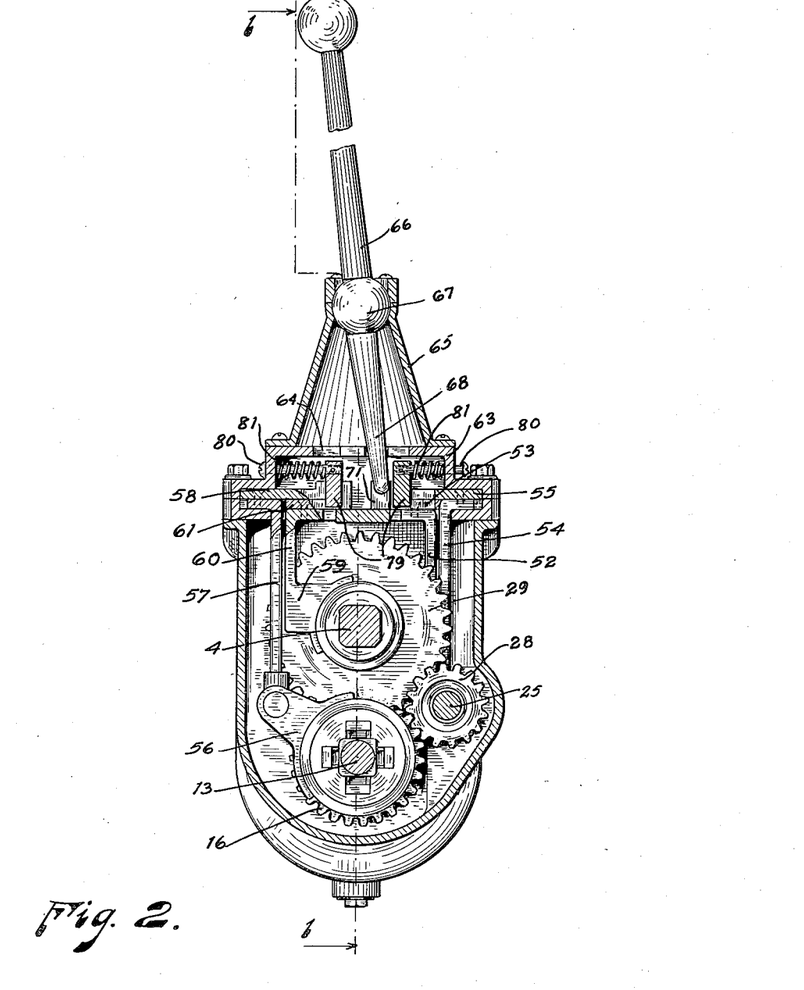
Fig. 2 is a transverse section taken on line 2—2, Fig. 1.
Figure 3:
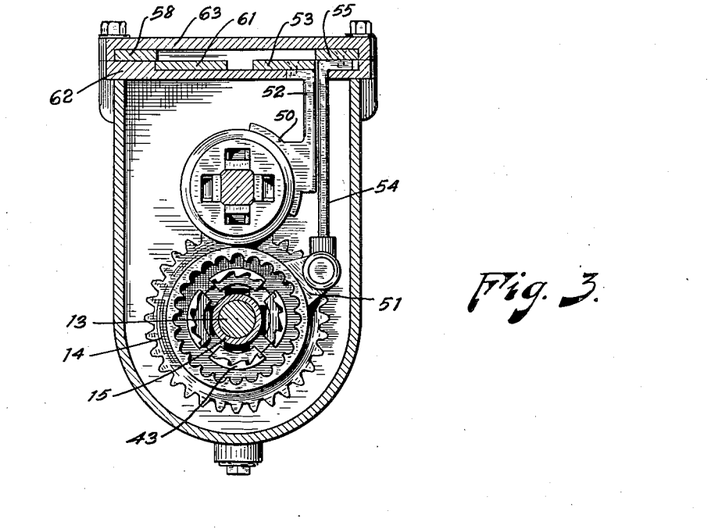
Fig. 3 is a transverse section taken on line 3—3, Fig. 1.

The drive shaft 1 is connected to the clutch, which has not been shown, and serves to transmit power from the engine to the transmission gear set. Numeral 2 represents the propeller shaft which is connected by a universal coupling 3 to the counter shaft 4. The end of shaft 1 terminates within the casing 5 and has a gear 6 formed integral therewith. A threaded circular flange 7 projects outwardly from the gear 6. The inner end of shaft 1 is hollow and is lined by a bushing 8. The counter shaft 4 has a cylindrical end 9 that is rotatable within the bushing 8. Shaft 4 has the central portion thereof provided with flattened sides 10. Parallel with shaft 4 and journaled at 11 and 12 to the casing 5 is a shaft 13. Non-rotatably secured to shaft 13 is a gear wheel 14 which is meshed with gear 6. Secured to gear 14 is a cylindrical sleeve 15 that extends substantially one-half the length of the shaft. Keyed to shaft 13 at the end of sleeve 15 is a gear 16. On the opposite side of gear 16 from the sleeve 15, I secure a second sleeve member 17, the outer end of which is threaded as indicated at 18. Secured to the inner end of sleeve 17 is a gear 19 that is held against rotation on sleeve 17 by suitable means such as a key 20. Rotatably secured to the inner end of sleeve 15 is a sleeve member 21 which is similar to the member designated by numeral 17 and has a threaded portion 22 corresponding to 18. A gear 23 is non-rotatably connected to sleeve 21 and meshes with the gear 24 that is non-rotatably and non-slidably secured to shaft 4. From the description so far given it is evident that when shaft 1 is rotated, it will cause the shaft 13 to rotate through the medium of gears 6 and 14. Since gears 19 and 23 are rotatable on the sleeves 15 and 17, the shaft 4 will not be rotated until clutch means, yet to be described, are made operative. Before I describe the construction of the clutches, I will describe the mechanism by means of which the direction of rotation of the shaft 4 may be determined. It is evident that when gear 19 is clamped against rotation with respect to sleeve 17, it will cause the shaft 4 to rotate in a direction that will make the automobile go in a forward direction. In order to reverse the direction of travel of the machine, it is necessary to reverse the direction of rotation of the shaft 4. This is accomplished by the following mechanism:

Referring now more particularly to Fig. 2, it will be noticed that there is a shaft 25 that is parallel with, but spaced from shafts 4 and 13. Rotatably mounted on this shaft is a double gear comprising a central cylindrical member 26, the ends of which are formed into gears 27 and 28. Gear 16 meshes with gear 27 so that gears 27 and 28 always rotate whenever shaft 13 rotates. A low and reverse gear 29 is normally in mesh with the low gear pinion 19, but is slidably mounted on shaft 4 so that it may be moved out of operative relation with pinion 19 and into mesh with gear 28. It is obvious that moving gear 29 out of contact with pinion 19 and into contact with pinion 28 will cause a reversal of relative rotation between shafts 4 and 13. The position in which gears 28 and 29 are operatively connected, will be referred to as the reverse position. Attention is called at this place to the fact that the intermediate gears 23 and 24 and the low gears 19 and 29 are always in mesh, except when the car is reversed. In order to make a direct coupling between shafts 1 and 4 or between shaft 13 and gears 19 or 23, I employ a novel clutch which I will now describe in detail, reference for this purpose being had to Figs. 5 to 11, inclusive.

In the transmission I employ three clutches, but since they are all alike, except as to dimensions I shall direct my explanation to the one that serves to connect the low gear pinion 19 to the shaft 13. Shaft 13 has a flattened portion 30 on four sides thereof near the round bearing surface 11. The cross-section shown in Fig. 7 shows the shape of the shaft at this point. A shoulder 31 projects outwardly between the end of the flattened surface 30 and the round part of the shaft and this serves as an abutment for the end of sleeve 17. Slidably mounted on that part of the shaft which has the flattened sides is a ring 32. This ring has its lefthand end (Figs. 5 and 6) provided with an opening that fits the shaft and permits it to slide thereon. The flat sides surrounding the opening have rectangular slots 33 cut therein. The sides of the slots 33 are provided with triangular notches or recesses 34 near their outer ends. These notches have their inner sides 35 inwardly and upwardly inclined. The inner or lefthand end of ring 32 has a cylindrical flange 36 whose inner surface is provided with a plurality of inwardly projecting teeth 37. These teeth are so spaced that they will receive the teeth on gear 19, in the manner shown in Fig. 6, for locking the gear and the ring against relative rotation. A conical inclined surface 38 connects with the cylindrical sides of the cylindrical opening 39. The end of sleeve 17, nearest ring 32, is provided with a steep pitch multiple thread 18 whose function will presently appear. Within each one of the four slots 33, there is a clutch jaw member shown in Figs. 10 and 11. These members have each a rectangular central portion 40 whose width is such that it fits loosely within the slots 33. The outer or righthand end of each jaw member has outwardly extending lugs 41 which have their lower surface inclined as indicated by numeral 42. These lugs are adapted to enter recesses 34 in the manner shown in Figs. 5, 6 and 8, and the inclined surfaces 42 are adapted to engage the cooperating inclined sides 35 of the recesses. The inner or lefthand end 43 of each jaw member is cylindrical and subtends an arc of approximately 90 degrees. The inner cylindrical surface is provided with threads 44 that are adapted to engage and cooperate with the threaded end 18 of the sleeve 17 in the manner shown in Fig. 6. Each jaw member has an inclined surface 45 that cooperates with the correspondingly inclined surface 38 of the ring 32. A collar 46 or an equivalent element is secured to the shaft at a point between the cylindrical bearing surface 11 and the ends of the flattened surfaces 30 as plainly shown in Figs. 5 and 6. This collar limits the outward movement of the ring 32 and serves as a stop against which the ends of the jaw members abut. When the parts are in the position shown in Fig. 5, the jaw members are held in the position shown by the cooperative action of the collar 46, lugs 41 and inclined sides 35 and 42. When the ring 32 is moved towards the left, the inclined surface 38 of the ring comes into engagement with the corresponding inclined surfaces 45 of the jaws. A further movement of the ring forces the jaw members towards the shaft and the sides of the several arcuate surfaces 43 come together until they form a cylindrical nut. A further movement of the ring towards the left causes the shoulders 47 to engage the shoulders 48 on the jaws and to force them towards the left. The shaft 13 rotates in the direction of the arrows in Figs. 5 and 6, while the sleeve 17 stands still or rotates more slowly. When the jaws come into contact with the threaded end 18, the corresponding threads will engage.

Figure 5:
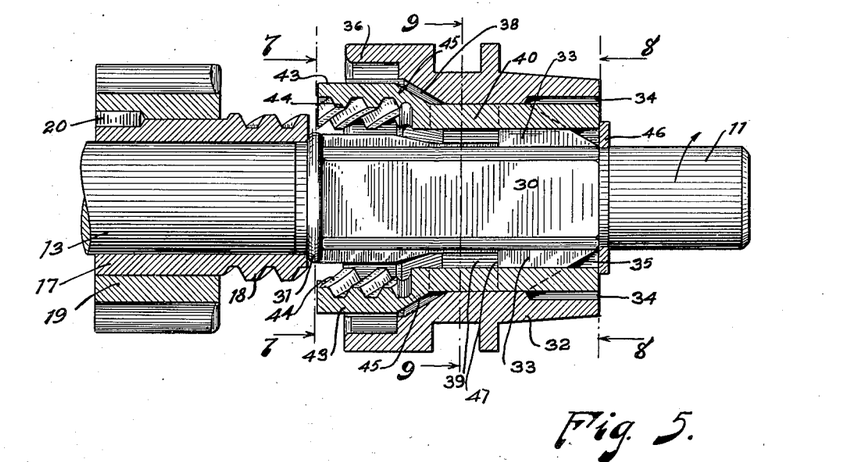
Fig. 5 is a longitudinal section of my improved clutch construction showing the same in inoperative position.

The pitch of the threads is very steep so that the angle that the threads make with a plane passing through the axis of the shaft will be substantially equal to or slightly greater than the angle of repose for lubricated surfaces. As a result of the steep pitch of the threads, there will be considerable torque produced which will start the gear 19 rotating if it is standing still. When the jaw members arrive at the position shown in Fig. 6, they can have no further longitudinal movement and as a result, the gear 19 (Fig. 6) will be forced to travel in synchronism with the drive shaft 13, after which the teeth on the flange 36 are moved into engagement with the teeth on wheel 19 to lock the parts against rotation. The gear 19 will now be rotating at the same speed as the jaws and the ring 32, and the parts are so adjusted that when the jaws cease to move longitudinally, the teeth 37 on the ring are in alignment with the spaces between the gear teeth on the gear 19, so that by a further movement of the ring the teeth on the internal gear on flange 36 will interengage with the teeth on the external gear and form a positive connection between the shaft and gear 19. When the clutch is to be released, the ring 32 is moved towards the right. Since the jaw members are held against longitudinal movement by the action of the threads, it follows that there will be relative longitudinal movement between the ring and the jaws. When the ring has moved such a distance that the inclined surface 38 reaches the inclined surface 45, the jaws begin to spread apart due to the action of the threads, the inclined sides 35 and 42, and the centrifugal force. As the jaws engage the collar 46 they are held in spread position by the action of the inclined surfaces 35 and 42 until the ring is again moved towards the left. It will be seen from the above that when it is desired to connect the shaft 13 to the gear 19, the same is accomplished by means that first exerts a torque that starts the stationary parts rotating and which bring them to the same speed as that of the rotary member so that when the positive connection between ring 32 and gear 19 is effected, it will cause no shock due to sudden acceleration. The several clutches used in the transmission gear set illustrated and described are indicated by letters A, B and C. The one specifically described above is indicated by the letter C.

It is, of course, necessary to provide means which will permit the driver to operate any one of the clutches at will and to move gear 29 from low gear to reverse position. This is accomplished by means that will now be described.

The ring members 32 are each provided on their outer surfaces with grooves 49, a similar groove being also provided on the hub of the gear 29. Cooperating with grooves 49 on the ring members belonging to clutches A and B respectively are forks 50 and 51. Fork 50 is connected by means of an arm 52 with a sliding plate 53 while fork 51 is connected by a similar arm 54 with a plate 55. The groove 49 in the ring member forming part of clutch C has cooperatively connected thereto a fork 56 which in turn is connected by an arm 57 with the plate 58, while a similar fork 59 cooperates with the groove in the hub of gear 29 and is connected by arm 60 with the plate 61. The plates 53, 55, 58 and 61 are slidably mounted in a compartment between the cover plates 62 and 63. It is evident that when the plates are moved, the forks which are attached thereto and the parts that are connected to the forks will also move.

Figure 1:
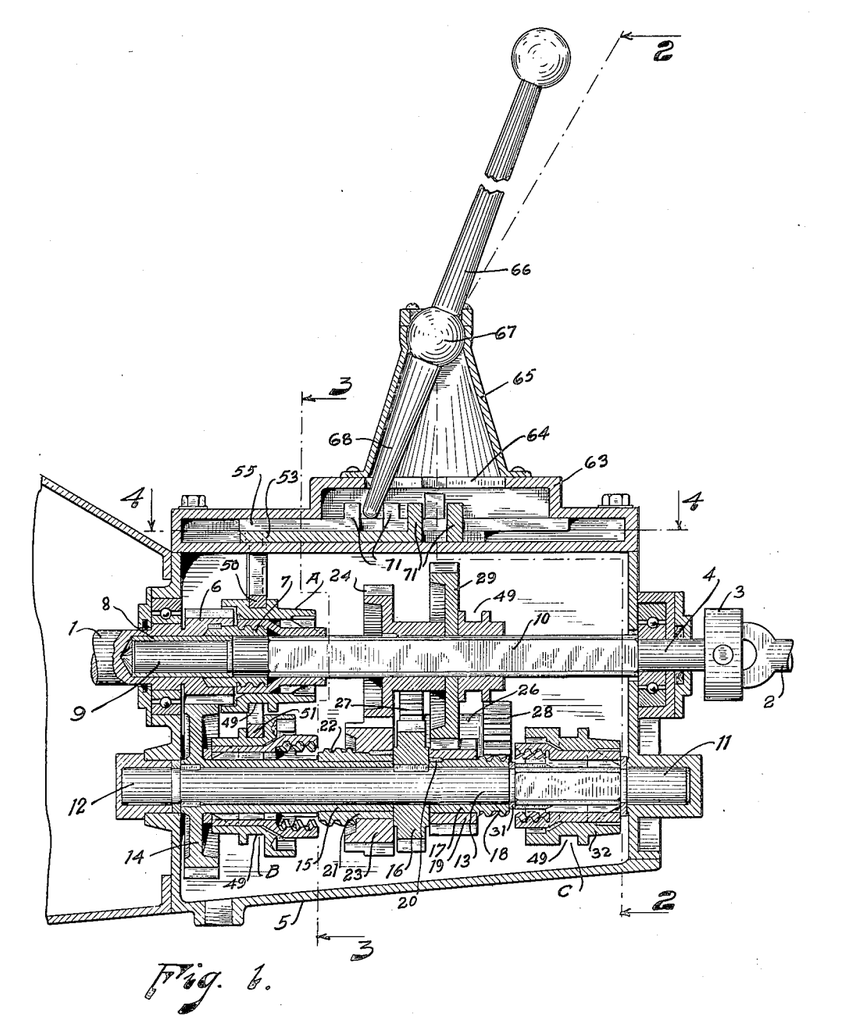
Fig. 1 is a longitudinal vertical section through my improved transmission taken on line 1—1, Fig. 2.
Figure 4:
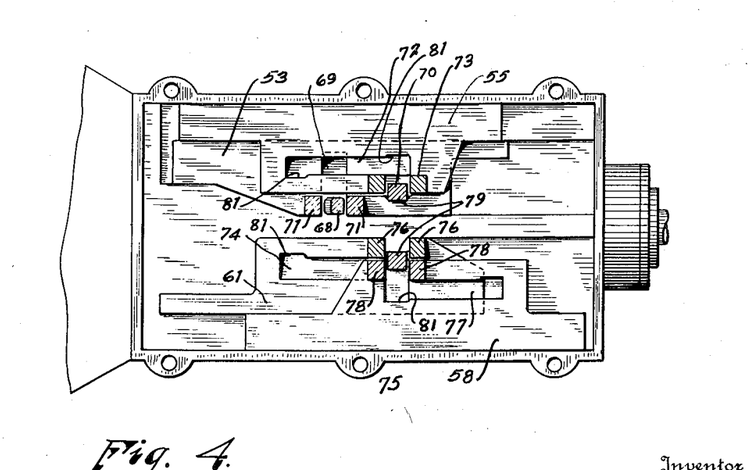
Fig. 4 is a horizontal section taken on line 4—4, Fig. 1.

I will now explain the means employed for selectively engaging and moving each of said plates. Referring now more particularly to Figs. 1, 2 and 4, it will be noticed that plate 63 has a raised central portion which has an H slot cut therein, as indicated by the numeral 64. Secured to the raised portion of plate 63 is a conical casing 65, to the upper end of which the gear shift lever 66 is connected by a ball and socket joint 67, which permits universal movement. The lower end 68 of the gear shift lever projects through the H slot and cooperates with the plates in a manner which will now be described. Referring now to Fig. 4 we will notice that plate 53 has a T-shaped slot comprising the parts indicated by numerals 69 and 70. It is also provided with upwardly extending lugs 71. Plate 55 has an L-shaped slot 72 and upwardly projecting lugs 73. Plate 61 has a T-shaped slot comprising the slots indicated by numerals 74 and 75 and upwardly projecting lugs 76. Plate 58 has an L-shaped slot 77 and lugs 78. The lower end of handle 68 projects downwardly far enough to engage the projections 71, 73, 76 and 78, but terminates above the upper surface of plates 53 and 61. For the purpose of locking the plates in neutral position, except when they are to be shifted, I have provided locking lugs 79. These lugs are secured to the inner ends of bolts 80 and are held in their innermost position by means of spring 81. The locking lugs normally occupy the position shown in connection with plates 58 and 61 in Fig. 4 in which position it locks both plates in neutral position. When the gears are to be shifted the end 68 of the gear shift lever is moved to neutral and the locking lug is moved out of locking position with the plate to be shifted, but still serves to lock the other plate in neutral in the manner shown in connection with plates 53 and 55 in Fig. 4. It will be noticed that each of the slots 70, 72, 74 and 78 have locking recesses 81 which cooperate with the locking lugs 79 in the manner shown in connection with plate 53 in Fig. 4.

Figure 12:
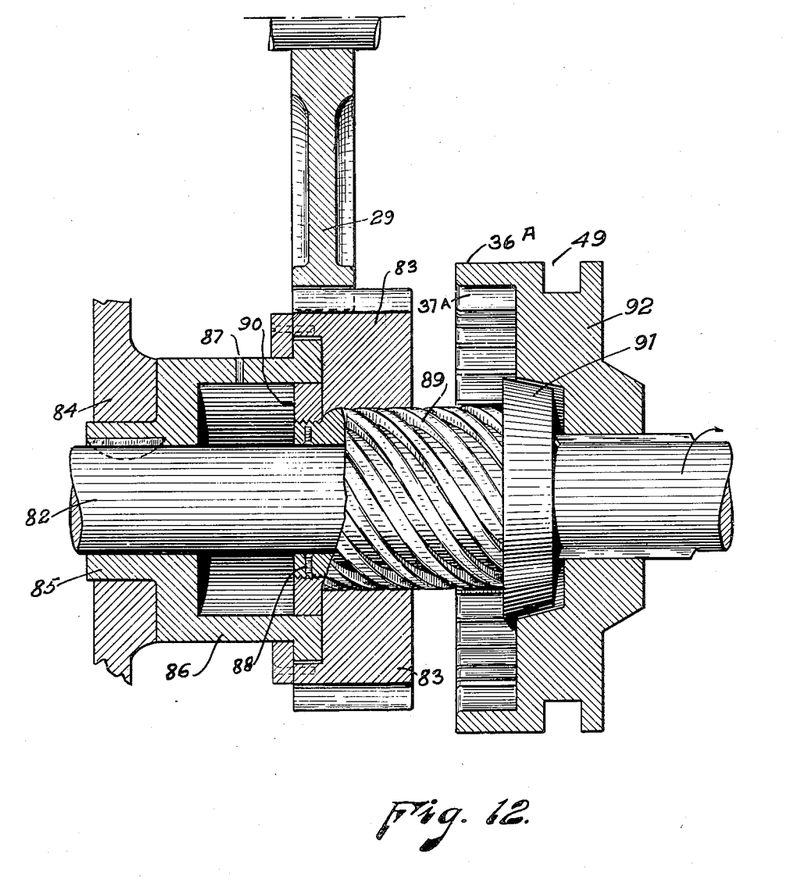
Fig. 12 is a longitudinal section of a modified form of clutch.

In Fig. 12 I have shown a modified form of clutch, which, however, embodies the same broad principles as the one already described.

Figure 6:
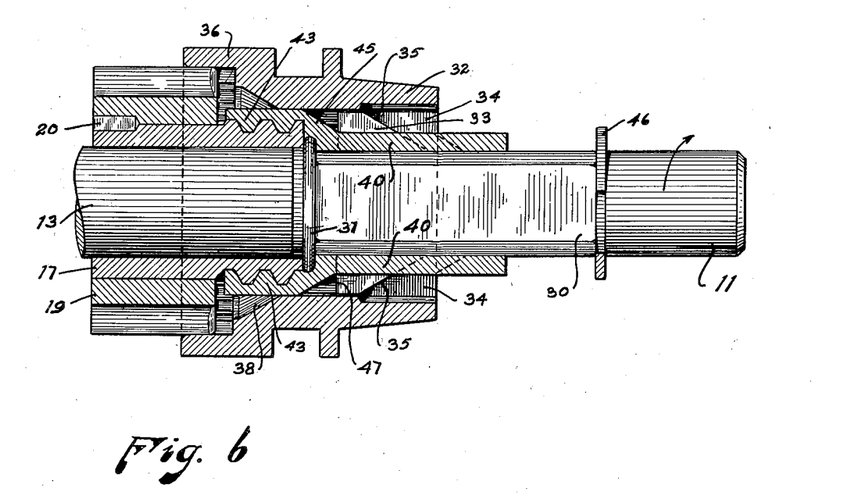
Fig. 6 is a longitudinal section similar to that shown in Fig. 5, but showing the parts in operative position.
Figure 7:
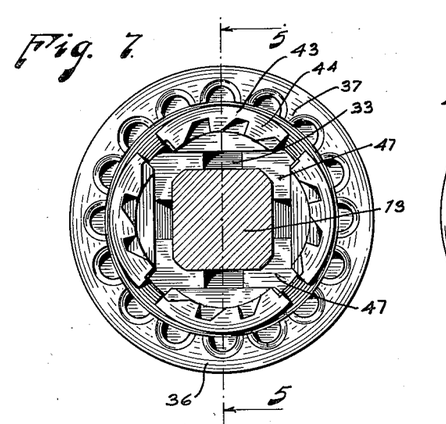
Fig. 7 is a section taken on line 7—7, Fig. 5.
Figure 8:
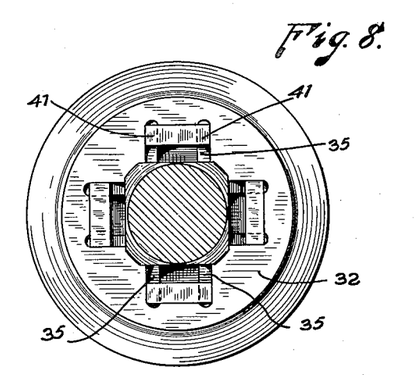
Fig. 8 is a section taken on line 8—8, Fig. 5.
Figure 9:
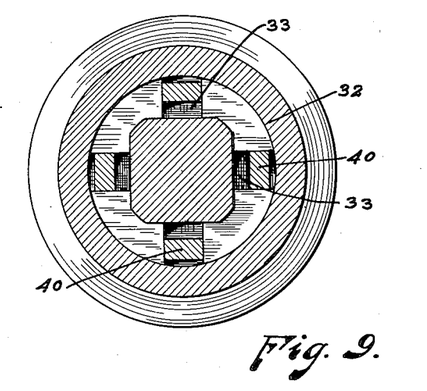
Fig. 9 is a section taken on line 9—9, Fig. 5.
Figure 10:
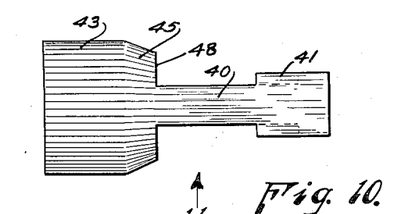
Fig. 10 is a plan view of one of the jaw members taken in the direction of arrow 10, Fig. 11.
Figure 11:
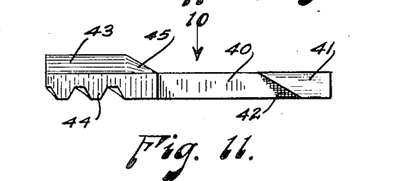
Fig. 11 is a side elevation of the jaw member looking in the direction of arrow 11.

Shaft 82 corresponds to shaft 13 in Figs. 5 and 6 and gear 83 corresponds to the gear 19, while the part indicated by numeral 84 corresponds to gear 16. Splined to shaft 82 is a collar 85, to one end of which the gear 84 is non-rotatably connected. Collar 85 has a cylindrical flange 86 of considerably larger internal diameter than the shaft and is provided with an opening 87 for the escape of air. Slidably and rotatably mounted on shaft 82 is a sleeve 88, the outer surface of which is provided with multiple threads 89 of steep pitch. The gear 83 has a threaded central opening and is cooperatively associated with the threaded sleeve. To one end of the sleeve 88, I secure a flange 90 whose outer diameter is the same as the inner diameter of the flange 86. The opposite end of sleeve 88 has a flange 91 whose outer surface is tapered. A ring member 92, which corresponds to the ring member 32 in Fig. 5, is splined to the shaft and has an annular groove 49 for the reception of the shifting fork 56, by means of which it can be shifted longitudinally on the shaft. Ring 92 has a flange 36$^A$ provided with internal teeth 37$^A$ that engage between the teeth on the gear 83 in the manner shown in Fig. 6. Let us now assume that shaft 82 rotates in the direction of the arrow and that it is desired to put gears 83 and 29 into rotation. By means of the shifting lever the ring 92 is moved towards the left. The tapered walls 92 thereof are brought into engagement with the tapered wall 91 and the resulting friction tends to rotate the sleeve 88. The steepness of the pitch of the threads causes a considerable torque to be exerted on the gear 83 whose speed of rotation is thereby increased. The pressure exerted on ring 92 moves the sleeve towards the left and very soon the teeth 37$^A$ approach the teeth on gear 83. When further movement causes the flange 36$^A$ to telescope over the outside of gear 83 and to lock the latter to the shaft. When the gear is to be released, the ring is moved to the right whereby the parts assume the inoperative position shown in Fig. 12.

From the description above given, it will be apparent that I have produced a transmission gear set that is so constructed that the various gears used for intermediate and low are always in mesh and that there can therefore be no clashing of gears when a shift is made. The various gears are made operative through the action of clutches which do not make a positive connection until the parts are brought into the proper speed. My transmission is also so designed that it can be shifted without disconnecting the engine, which greatly simplifies the operation and enables the gears to be shifted in less time.

Having now described my invention, what I claim as new is:

1. An auomobile transmission gear set comprising spaced parallel driving and driven shafts, a plurality of pairs of gears of different pitch diameters connected to said shafts, the gears that are carried by the driving shaft being rotatable thereon, means for selectively locking one gear of each pair to the driving shaft, said means comprising a threaded member operatively connected to the gear, and means slidably and non-rotatably connected to the driving shaft for engaging said threaded member, said last-named means comprising a plurality of radially movable jaw members having their end portions provided with internal threads adapted to cooperate with the threads on the threaded member.

2. An automobile transmission gear set comprising spaced parallel driving and driven shafts, a plurality of pairs of gears of different pitch diameters connected to said shafts, the gears that are carried by the driving shaft being rotatable thereon, means for selectively locking one gear of each pair to the driving shaft, said means comprising a threaded member operatively connected to the gear, means slidably and non-rotatably connected to the driving shaft for engaging said threaded member, said last-named means comprising a plurality of radially movable jaw members having their end portions provided with internal threads adapted to cooperate with the threads on the threaded member, and means for moving said jaws into operative position with the threaded member.

3. An automobile transmission gear set comprising spaced parallel driving and driven shafts, a plurality of pairs of gears of different pitch diameters connected to said shafts, the gears that are carried by the driving shaft being rotatable thereon, means for selectively locking one gear of each pair to the driving shaft, said means comprising a threaded member operatively connected to the gear, means slidably and non-rotatably connected to the driving shaft for engaging said threaded member, said last-named means comprising a plurality of radially movable jaw members having their end portions provided with internal threads of steep pitch adapted to cooperate with the corresponding threads on the threaded member, means for moving said jaws into operative position with the threaded member, said means comprising a ring member slidably but non-rotatably connected to the shaft, and means for moving said ring.

4. A clutch mechanism comprising, in combination, a rotatable driving shaft, a driven member rotatably mounted thereon, said last-named member having a hub portion provided with steep pitch multiple threads connected thereto, a ring member slidably but non-rotatably connected to the shaft, a plurality of jaws carried by said ring member, said jaws being slidably connected thereto, means for moving said ring, co-operating means on the ring and the jaws for forcing the latter towards the shaft as the ring moves, one end of said jaw members being threaded for engagement with the threaded portion of the driven member.

5. A clutch mechanism comprising, in combination, a driving shaft, a gear rotatably mounted thereon, a ring slidably mounted on the shaft, means on the shaft and ring for preventing relative rotation, said ring having a flange provided with internally projecting teeth adapted to engage with the teeth on the gear, said gear having a threaded hub portion on the side nearest the ring, a plurality of jaw members carried by the ring, said jaws having one end thereof internally threaded and adapted to engage the threaded hub portion, and cooperating means on the jaws and the ring for moving the jaws into cooperative engagement with the threaded hub.

6. A clutch mechanism comprising, in combination, a driving shaft, a gear rotatably mounted thereon, a ring slidably mounted on the shaft, means on the shaft and ring for preventing relative rotation, said ring having a flange provided with internally projecting teeth adapted to engage with the teeth on the gear, said gear having a threaded hub portion on the side nearest the ring, a plurality of jaw members carried by the ring, said jaws having one end thereof internally threaded and adapted to engage the threaded hub portion, and cooperating means on the jaws and the ring for moving the jaws into cooperative engagement with the threaded hub, said last-named means comprising an internal inclined surface carried by the ring, and cooperating inclined shoulders on the jaws.

7. A clutch comprising, in combination, a driving shaft, a driven gear member rotatably associated therewith, a ring member slidably and non-rotatably mounted on the shaft, said ring having a flange at an end, said flange being provided with internal teeth adapted to engage with the teeth on the gear, means for sliding said ring into and out of cooperative engagement with the gear, said gear having an externally threaded hub portion secured thereto, said ring having a plurality of longitudinal slots in its inner surface, a jaw member in each slot, said jaw members having one end thereof internally threaded and adapted to cooperate with the threads on the hub, said ring and said jaws having inclined surfaces for causing the jaws to move radially.

8. An automobile transmission gear set comprising spaced parallel driving and driven shafts, a plurality of pairs of gears of different pitch diameters connected to said shafts, the gears that are carried by one of said shafts being rotatable thereon, means for selectively locking one gear of each pair to its shaft, said means comprising an externally threaded member having steep pitch threads operatively connected to the gear, and means slidably and non-rotatably connected to the shaft for engaging said threaded member, said last-named means comprising a plurality of jaw members having their end portions provided with internal threads adapted to cooperate with the threads on the externally threaded member.

9. An automobile transmission gear set comprising spaced parallel driving and driven shafts, a plurality of pairs of gears of different pitch diameters connected to said shafts, the gears that are carried by one of the shafts being rotatable thereon, means for selectively locking one gear of each pair to its shaft, said means comprising an externally threaded member having steep pitch threads operatively connected to the gear, means slidably and non-rotatably connected to the shaft for engaging said externally threaded member, said last-named means comprising a plurality of jaw members having their end portions provided with internal threads adapted to engage the threads on the externally threaded member, and means for moving said jaws into operative position with the threaded member.

In testimony whereof I affix my signature.

HARRY B. ROSS.